United States Patent
Matsuura et al.

(10) Patent No.: US 7,605,746 B2
(45) Date of Patent: Oct. 20, 2009

(54) IN-VEHICLE RADAR DEVICE

(75) Inventors: Yoshio Matsuura, Kasugai (JP); Masao Komaya, Komaki (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 12/266,381

(22) Filed: Nov. 6, 2008

(65) Prior Publication Data
US 2009/0135047 A1    May 28, 2009

(30) Foreign Application Priority Data
Nov. 7, 2007    (JP)    ............................. 2007-289217

(51) Int. Cl.
*G01S 13/93*    (2006.01)
(52) U.S. Cl. ............................. 342/70; 342/71; 342/90
(58) Field of Classification Search ............. 342/70–72, 342/74, 75, 81, 90
See application file for complete search history.

(56) References Cited

U.S. PATENT DOCUMENTS

| | | | | |
|---|---|---|---|---|
| 5,784,023 | A * | 7/1998 | Bluege | 342/104 |
| 6,072,422 | A * | 6/2000 | Yamada | 342/70 |
| 6,246,357 | B1 * | 6/2001 | Uehara | 342/70 |
| 6,377,205 | B1 * | 4/2002 | Eckersten et al. | 342/90 |
| 7,202,810 | B2 * | 4/2007 | Mitsumoto | 342/70 |
| 7,283,212 | B2 * | 10/2007 | Arita et al. | 356/5.01 |
| 7,466,260 | B2 * | 12/2008 | Ishii et al. | 342/70 |
| 2004/0257556 | A1 * | 12/2004 | Samukawa et al. | 356/4.01 |
| 2005/0219506 | A1 * | 10/2005 | Okuda et al. | 356/28 |
| 2006/0274299 | A1 * | 12/2006 | Matsuura et al. | 356/4.01 |
| 2008/0231514 | A1 * | 9/2008 | Matsuura et al. | 342/453 |
| 2008/0258964 | A1 * | 10/2008 | Schoeberl et al. | 342/189 |
| 2009/0135047 | A1 * | 5/2009 | Matsuura et al. | 342/70 |

FOREIGN PATENT DOCUMENTS

| EP | 1566659 A1 * | 8/2005 |
|---|---|---|
| JP | 2003-042757 | 2/2003 |

\* cited by examiner

*Primary Examiner*—John B Sotomayor
(74) *Attorney, Agent, or Firm*—Osha • Liang LLP

(57) ABSTRACT

An in-vehicle radar device has a transmission section for emitting an electromagnetic wave, a scanning section for horizontally scanning the electromagnetic wave emitted by the transmission section, and a reception section for receiving a reflected wave reflected by a target with respect to the electromagnetic wave emitted by the transmission section. The in-vehicle radar device detects, based on an elapsed time from when the transmission section emitted the electromagnetic wave until the reception section receives the reflected wave and the scanning direction of the electromagnetic wave by the scanning section, at least a position and a horizontal width of the target reflecting the electromagnetic wave. The in-vehicle radar device further has a storage section for storing intensity of a previous time or a few tines before of the reflected wave received by the reception section, a comparing section for comparing the intensity of the reflected wave of the previous time or the few times before stored in the storage section and intensity for this time, and a first judgment section for judging that the target detected this tine differs from a target continuously detected the from the previous time or the few times before when the intensity of the reflected wave for this tine suddenly decreased compared to the intensity of the previous time or the few tines before, and the horizontal width of the target becomes greater than a horizontal width of a general vehicle.

4 Claims, 11 Drawing Sheets

| i | Distance | Reception level (intensity of light received) |
|---|---|---|
| 0 | | |
| 1 | | |
| 2 | | |
| ⋯ | ⋯ | ⋯ |
| n | | |

Fig. 4

IN-VEHICLE RADAR DEVICE

BACKGROUND OF THE INVENTION

1. Technical Field

The present invention relates to an in-vehicle radar device mounted on a vehicle such as automobile (hereinafter referred to as a vehicle).

2. Related Art

An in-vehicle radar device is a radar device of a so-called pulse radar type for emitting electromagnetic waves such as an electric wave and light towards the front side of a vehicle in a bundle (pulse form), and detecting information including a distance and a direction to an obstacle at the front side of an own vehicle based on the reflected wave from the front side of the vehicle. An electric field and a magnetic field include a static field, which is temporally constant, and a wave field which temporally fluctuates and propagates to a distant in space, where the wave field is referred to as a "electromagnetic wave". The typical electromagnetic wave is an electric wave, but light, X-ray and the like are also electromagnetic waves.

The electromagnetic wave of pulse form emitted from a transmission unit of the in-vehicle radar device is reflected by a body surface (rear reflector or reflecting site corresponding thereto) of an obstacle at front of the own vehicle (hereinafter referred to as a leading vehicle for the sake of convenience), and received by a reception unit of the in-vehicle radar device. Assuming a time from an emission of the electromagnetic wave to a reception of the reflected wave is T, the distance L from the leading vehicle is given by "L=(T×velocity of light)/2". The direction of the leading vehicle with the own vehicle (vehicle installed with in-vehicle radar device) as a reference is obtained in the emitting direction of the pulse-form electromagnetic wave, and for instance, the direction of the leading vehicle is obtained as 0 degrees if the emitting direction is 0 degrees (i.e., advancing direction of the own vehicle).

The related art of the in-vehicle radar device as described in Japanese Unexamined Patent Publication No. 2003-42757 for example is known. In this radar device, the laser beam, which is one type of electromagnetic wave, is emitted in pulse-form for every one unit region of a horizontal scan (monitoring region in the horizontal direction at the front side of the own vehicle, that is, region segmentalized from a horizontal scanning region, hereinafter referred to as a horizontal scanning unit region), a distance to the leading vehicle is obtained from the time until receiving the reflected wave from an obstacle such as the leading vehicle, and a direction of the leading vehicle is obtained from the scan angle (horizontal scan angle) of the horizontal scanning unit region of when the reflected wave is obtained.

According to the principle described above, the in-vehicle radar device detects the distance and the direction to the obstacle (leading vehicle etc.) in front of the vehicle, but the reflected wave also includes reflected wave from that which should not originally be detected as an obstacle such as road surface, in which case, the road surface may be wrongly detected as false obstacle.

In the related art, focusing on the difference in the waveform of the reflected wave from the leading vehicle and the reflected wave from the road surface, more specifically, on the fact that the intensity of the reflected wave from the leading vehicle is greater than that of the reflected wave from the road surface and that the duration time (spread of the base of the reflected waveform) of the reflected wave from the leading vehicle is shorter than that of the reflected wave from the road surface, a mechanism for distinguishing them (leading vehicle and road surface) based on such differences is disclosed (see paragraph [0040] and FIG. 5 of Japanese Unexamined Patent Publication No. 2003-42757).

SUMMARY

However, in the conventional in-vehicle radar device described in Japanese Unexamined Patent Publication No. 2003-42757, a leading vehicle and a road surface are distinguished based simply on a "difference in waveform of the reflected wave from the leading vehicle and the reflected wave from the road surface", and thus the road surface and the leading vehicle cannot be distinguished in the following situations.

FIG. 10 shows an explanatory view (case of the uphill) of the related art. In this figure, suppose a leading vehicle 2 traveling in front of an own vehicle 1 is captured by a laser beam 4 emitted from an in-vehicle radar device 3 of the own vehicle 1, as shown in FIG. 10A. When the leading vehicle 2 starts to go up a steep hill, as shown in FIG. 10B, the laser beam 4 emitted from the in-vehicle radar device 3 deviates from the leading vehicle 2 and irradiates a climbing road 5. Such climbing road 5 (steep hill) is often seen at the entrance of an indoor parking, climbing entrance of a bank etc., and the like.

Therefore, in this manner, when the laser beam 4 deviates from the leading vehicle 2 and irradiates the climbing road 5, the in-vehicle radar device 3 should essentially judge that the leading vehicle 2 is lost (lose sight) and quit capturing the target, and carry out the required procedures (e.g., lost alarm etc. to a driver), but the climbing road 5 is often wrongly recognized as the leading vehicle 2, and a result, the target capturing (leading 2→climbing road 5) is continued according to the experiments (using the related art described above) of the inventors of the present invention.

This is a wrong target capturing from the leading vehicle 2 to the climbing road 5. This wrong target capturing is hereinafter referred to as "transfer", where when such transfer occurs, wrong judgment is made that the leading vehicle 2 has suddenly stopped when the measurement result of the in-vehicle radar device 3 is used in an inter-vehicle distance control system, thereby falling into an undesirable situation where sudden braking of the own vehicle 1 is forced.

The cause of such involuntary result is assumed to be because the waveforms of the reflected wave reflected by the hill and the reflected wave from the leading vehicle 2 are very similar in the case of a steep hill (climbing road 5) of an extent the transfer occurs.

Such a transfer problem also occurs not only in the steep uphill but also in a downhill.

FIG. 11 shows an explanatory view (case of the downhill) of the related art. In the figure, suppose the leading vehicle 2 traveling in front of the own vehicle 1 is captured by the laser beam 4 emitted from the in-vehicle radar device 3 of the own vehicle 1, as shown in FIG. 11A. Assuming a steep downhill is in front of the leading vehicle 2, a fixed obstacle (typically, road sign board 6) that satisfactorily reflects light is installed in the middle of the downhill, and the road sign board 6 is positioned on an extended line in the irradiating direction of the laser beam 4.

When the leading vehicle 2 starts to go down the steep hill, as shown in FIG. 11B, the laser beam 4 emitted from the in-vehicle radar device 3 deviates from the leading vehicle 2 and irradiates the road sign board 6, and the wrong target capturing (transfer) from the leading vehicle 2 to the road sign board 6 occurs, similar to FIG. 10. Thus, wrong judgment is made that the leading vehicle 2 has suddenly stopped, thereby falling into an undesirable situation where sudden braking of the own vehicle 1 is forced. The cause thereof is also assumed to be because the waveforms of the reflected wave reflected by the fixed obstacle (road sign board 6) installed in the middle of the hill and the reflected wave from the leading vehicle 2 are very similar in the case of a steep hill of an extent the transfer occurs.

One or more embodiments of the present invention provides an in-vehicle radar device capable of avoiding the occurrence of wrong target capturing (transfer).

According to one or more embodiments of the invention, an in-vehicle radar device includes a transmission section for emitting an electromagnetic wave; a scanning section for horizontally scanning the electromagnetic wave emitted by the transmission section; and a reception section for receiving a reflected wave reflected by a target with respect to the electromagnetic wave emitted by the transmission section; the in-vehicle radar device detecting, based on an elapsed time from when the transmission section emitted the electromagnetic wave until the reception section receives the reflected wave and the scanning direction of the electromagnetic wave by the scanning section, at least a position and a horizontal width of the target reflecting the electromagnetic wave; the in-vehicle radar device further including a storage section for storing intensity of a previous time or a few times before of the reflected wave received by the reception section; a comparing section for comparing the intensity of the reflected wave of the previous time or the few times before stored in the storage section and intensity for this time; and a first judgment section for judging that the target detected this time differs from a target continuously detected the from a previous time or a few times before when the intensity of the reflected wave for this time suddenly decreased compared to the intensity of the previous time or the few times before, and the horizontal width of the target becomes greater than a horizontal width of a general vehicle.

The term "sudden decrease" will be defined. Assume two objects having a difference in the reflection efficiency of the electromagnetic wave to be a high reflection object and a low reflection object. It can be said that the body of the vehicle is the "high reflection object" since the surface is well polished and thus satisfactorily reflects the electromagnetic wave, whereas the road surface is the "low reflection object" since the surface is covered with microscopic bumps. "Sudden decrease" refers to change in the intensity of the reflected wave on the time axis when the reflected wave switches to the reflected wave from the low reflection object while receiving the reflected wave from the high reflection object. Therefore, "sudden" in sudden decrease is not quantitatively expressed. It is only required that the "switch" represents a unique change of a distinguishable extent.

According to one or more embodiments of the present invention, an in-vehicle radar device includes a transmission section for emitting an electromagnetic wave; a scanning section for horizontally scanning the electromagnetic wave emitted by the transmission section; and a reception section for receiving a reflected wave reflected by a target with respect to the electromagnetic wave emitted by the transmission section; the in-vehicle radar device detecting, based on an elapsed time from when the transmission section emitted the electromagnetic wave until the reception section receives the reflected wave and the scanning direction of the electromagnetic wave by the scanning section, at least a position and a horizontal width of the target reflecting the electromagnetic wave; the in-vehicle radar device further including a storage section for storing intensity of a previous time or a few times before of the reflected wave received by the reception section; a comparing section for comparing the intensity of the reflected wave of the previous time or the few times before stored in the storage section and intensity for this time; and a second judgment section for judging that the target detected this time differs from a target continuously detected from the previous time or the few times before when the intensity of the reflected wave for this time suddenly increased compared to the intensity of the previous time or the few times before.

The term "sudden increase" will be defined. An object that satisfactorily reflects the electromagnetic wave than the high reflection object is referred to as a "super high reflection object". An example of such a super high reflection object is a road sign board drawn with characters, figures and the like with paint mixed with glass powder. "Sudden increase" refers to change in the intensity of the reflected wave on the time axis when the reflected wave switches to the reflected wave from the super high reflection object while receiving the reflected wave from the high reflection object (body of vehicle). Therefore, "sudden" in sudden increase is not quantitatively expressed. It is only required that the "switch" represents a unique change of a distinguishable extent.

An in-vehicle radar device according to one or more embodiments of the present invention includes a changing section for changing an irradiation angle in a vertical direction of the electromagnetic wave upward when a wrong target is judged in the first judgment section.

An in-vehicle radar device according to one or more embodiments to the present invention includes a changing section for changing an irradiation angle in a vertical direction of the electromagnetic wave downward when a wrong target is judged in the second judgment section.

According to one or more embodiments of the present invention, judgment is made that the target detected this time is different from the target continuously detected from the previous time or the few times before when the intensity of the reflected wave is suddenly decreased and the horizontal width of the target is greater than the horizontal width of a general vehicle, or judgment is made that the target detected this time differs from the target continuously detected from the previous time or the few times before when the intensity of the reflected wave is suddenly increased, and thus an in-vehicle radar device capable of avoiding occurrence of involuntary "transfer" can be provided.

BRIEF DESCRIPTION OF THE DRAWINGS

FIG. 4 shows a configuration diagram of one example of a reception data table 19;

DETAILED DESCRIPTION

With reference to the drawings, an embodiment of the present invention will be described below using application to the in-vehicle radar device using laser beam by way of example. The specification and actual examples of various details, or illustration of numerical values, character strings, and other symbols in the following description are merely references to clarify the idea of the present invention, and it should be apparent that the idea of the present invention is not limited by all nor one part thereof. The description on the details of the well-known methods, the well-known procedures, the well-known architectures, and the well-known circuit configurations (hereinafter "well-known matters") will be avoided, but this is to simplify the description, and does not intentionally exclude all or one part of the well-known matters. Such well-known matters are known by those skilled in the art at the time of filing of the present invention, and thus are obviously included in the following description.

Figure 1A:
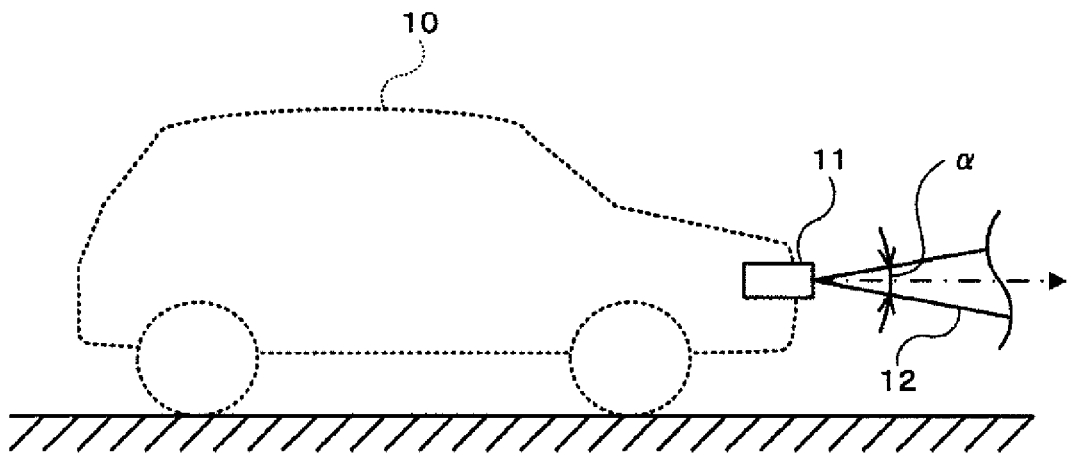
FIGS. 1A and 1B show overall configuration diagrams of an in-vehicle radar device according to an embodiment of the present invention.
Figure 1B:
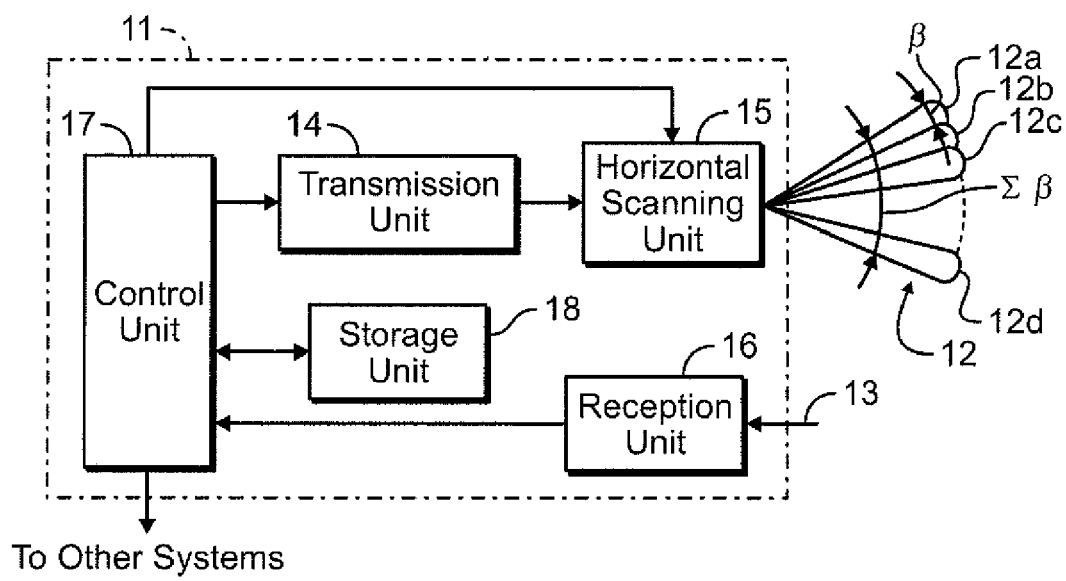

FIGS. 1A and 1B show overall configuration diagrams of an in-vehicle radar device according to an embodiment of the present invention. In the figure, an in-vehicle radar device 11 attached on a front side of an own vehicle 10 such as a front grill irradiates the front (advancing direction) of the own vehicle 10 with a laser beam 12 in a pulse form, receives a reflected light 13 (more precisely, receives light, but described as receive for the sake of convenience), and detects an obstacle (hereinafter also referred to as a target) such as leading vehicle existing on the front side of the own vehicle 10 from the reception data and calculates information including a distance to the target (distance from the own vehicle 10), a direction (direction with the advancing direction of the own vehicle 10 as a reference) and target width (width in the horizontal direction of the target), and outputs the information to other systems (e.g., leading vehicle following system etc.) mounted on the own vehicle 10.

Here, "laser" is an abbreviation (laser) of light amplification by stimulated emission of radiation, and is generally a coherent light in which the phase of a single wavelength is aligned and is understood as a light ray of beam shape which cross-section is thinly narrowed to a circle. The illustrated laser beam 12 complies with this interpretation in being a coherent light, but the shape of the cross-section of the beam does not comply. More specifically, the laser beam 12 differs in having a so-called fan beam shape in which a width $\alpha$ in a vertical direction is large with respect to a width $\beta$ in a horizontal direction.

The reason for having a fan beam shape is to be less susceptible to the up and down movement (pitching movement) of a vehicle body involved in the traveling of the own vehicle 10. That is, if the width $\alpha$ in the vertical direction is also narrowed, the laser beam 12 moves up and down with the pitching of the own vehicle 10 and the target cannot be captured, where such a drawback can be avoided by having the width $\alpha$ in the vertical direction slightly large in view of the pitching.

The width $\beta$ in the horizontal direction of the laser beam 12 determines the target resolution in the horizontal direction of the in-vehicle radar device 11, and thus is desirably as narrow as possible, but the width $\beta$ in the horizontal direction that is too narrow leads to increase in a horizontal scanning unit region, to be hereinafter described, and the scanning time of one horizontal scan (angle $\Sigma\beta$) becomes long with the increase in the amount of information, and thus the width $\beta$ is appropriately set in view of both aspects (target resolution and horizontal scanning time).

Briefly describing, the in-vehicle radar device 11 is configured including a transmission unit 14, a horizontal scanning unit 15, a reception unit 16, a control unit 17, and a storage unit 18.

The transmission unit 14 pulse modulates the laser beam and outputs to the horizontal scanning unit 15 according to a transmit instruction from the control unit 17. An output interval (pulse interval) of the laser beam determines a maximum detection distance of the in-vehicle radar device 11. The horizontal scanning unit 15 horizontally scans the laser beam of pulse form from the transmission unit 14 and irradiates the front side of the own vehicle 10 with the laser beam. The horizontal scan is sequentially carried out according to a scan instruction from the control unit 17 for every horizontal scanning unit regions 12a to 12d segmentalized from a predetermined horizontal scan angle $\Sigma\beta$ (angle sufficiently covering a monitoring range at the front side of the own vehicle 10, for example, angle of about 30 degrees), where the angle of the respective horizontal scanning unit regions 12a to 12d is $\beta$.

Note that the horizontal scan of the laser beam by the horizontal scanning unit 15 can be carried out through an optical method such as using a rotatable polygon mirror, but the idea of the present invention is not limited thereto. The point is to horizontally scan the laser beam in units of angle $\beta$ and in a range of a predetermined angle $\Sigma\beta$, and thus the range of the predetermined angle $\Sigma\beta$ may be horizontally scanned by arranging a laser light source such as a laser diode in an array form in units of angle $\beta$, and sequentially driving such light sources. In this case, the illustrated transmission unit 14 and the horizontal scanning unit 15 are not distinguished, and are integrated.

The control unit 17 includes that configured with a microprocessor unit of program control type (so-called computer) or that in which all or most logical portions are configured by hard logic, but the former configuration (configured by a computer) is adopted below for the sake of convenience, in which case, the control unit 17, through the execution of the control program to be hereinafter described, retrieves reception data of the reception unit 16 and stores the same in the storage unit 18 while controlling the operation of the transmission unit 14 and the horizontal scanning unit 15, detects the target such as the leading vehicle existing in front of the own vehicle 10 based on the reception data, calculates information including the distance and the direction to the target, as well as the target width from the distance and the direction, and outputs the information to other systems (e.g., inter-vehicle distance control system etc.) mounted on the own vehicle 10.

Figure 2:
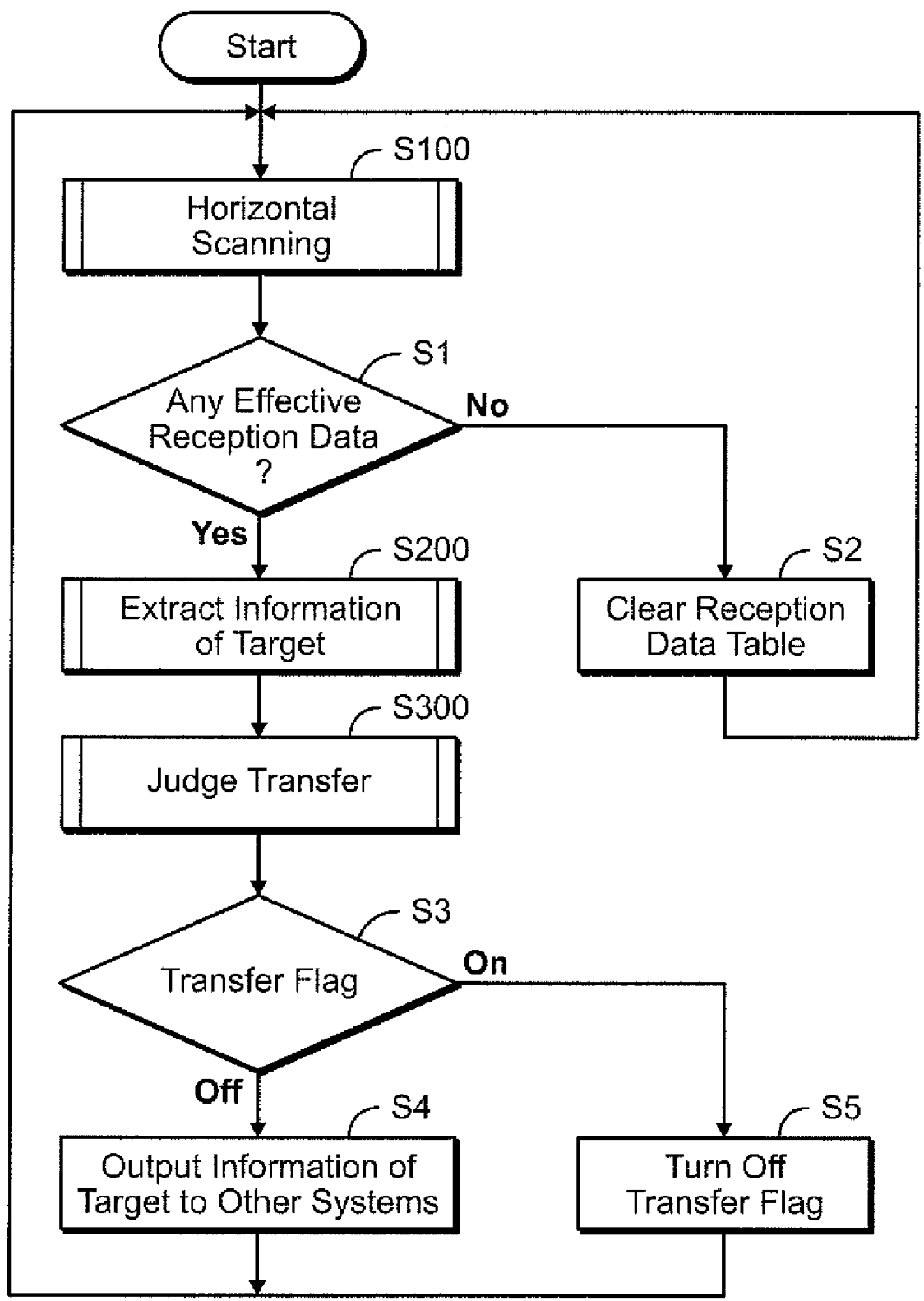
FIG. 2 shows a diagram showing a simple operation flow of a control program executed by a control unit 17.

FIG. 2 shows a diagram showing a simple operation flow of the control program executed by the control unit 17. In the control program, the reception data is first acquired while sequentially scanning the range of one horizontal scanning angle $\Sigma\beta$ by every horizontal scanning unit regions 12a to 12d (step S100). The specific description of the horizontal scanning process will be hereinafter described.

After one horizontal scanning process of the angle $\Sigma\beta$ is completed, judgment is then made whether or not effective reception data is included in the reception data acquired in such a horizontal scanning period (step S1), and a reception data table 19 (see FIG. 4) to be hereinafter described is cleared (step S2) if not included, and the horizontal scanning process is again executed (step S100). Here, "effective reception data" refers to the reception data of a magnitude exceeding a predetermined threshold value set in view of background noise and the like.

If judged that the effective reception data is present, the information (the distance, the direction to target, the target width, and the like) of the target is extracted based on the reception data (step S200). The specific description of the information extracting process of the target will be hereinafter described.

The "transfer judgment process" (step S300), which is the feature of the present embodiment, is then executed, and thereafter, a flag (transfer flag) that is turned ON when judged as transfer by the transfer judgment process is examined (step S3), where judgment is made that involuntary transfer has not occurred if the flag is turned OFF, and the information of the target extracted in step S200 is output to the other systems (step S4), and then the horizontal scanning process is again executed (step S100), whereas judgment is made that involuntary transfer has occurred if the transfer flag is turned ON, and the transfer flag is turned OFF (step S5), and then the horizontal scanning process is again executed (step S100).

Figure 3:
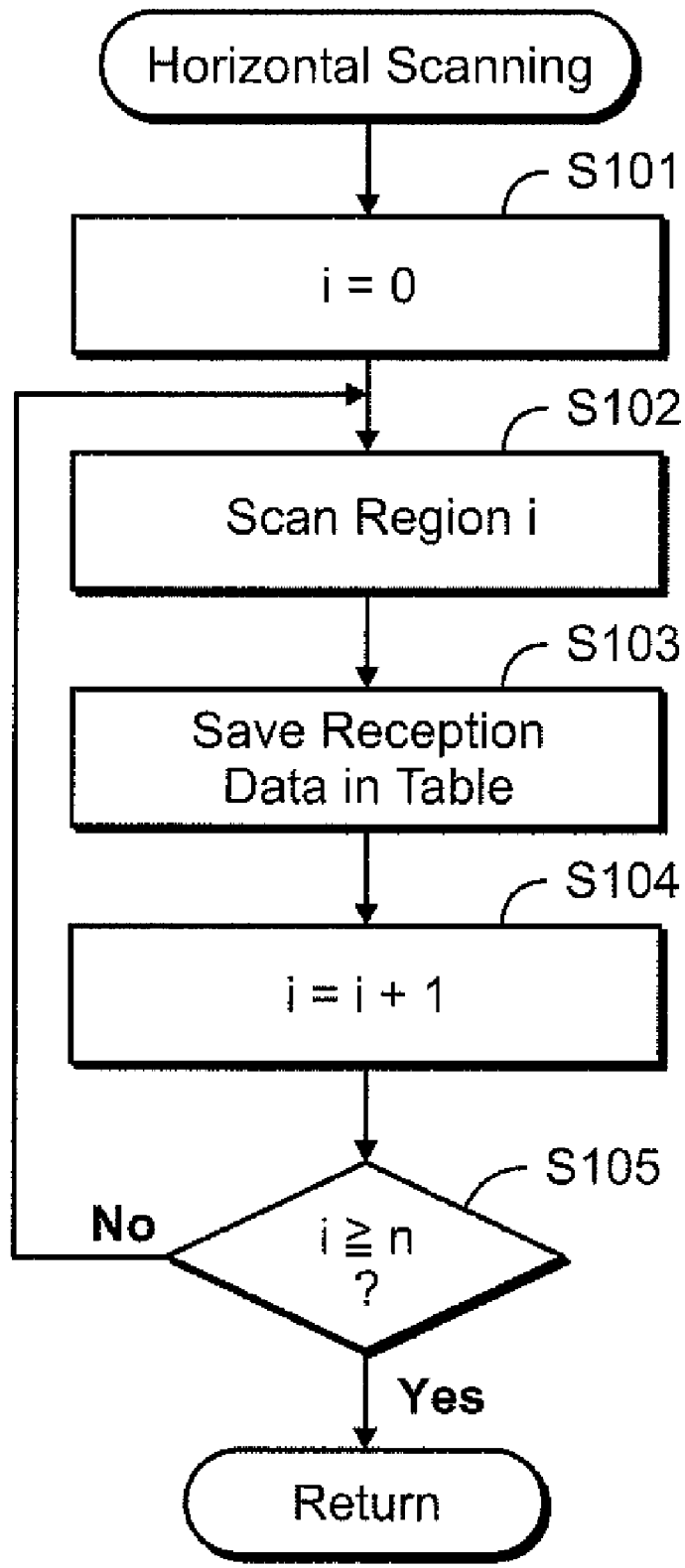
FIG. 3 shows a diagram showing a specific operation flow of a horizontal scanning process (step S100 of FIG. 2)

FIG. 3 shows a diagram showing a specific operation flow of the horizontal scanning process (step S100 of FIG. 2). In this flow, a variable i for specifying the horizontal scanning unit regions 12a to 12d is first initialized (i=0 (step S101), and then the $i^{th}$ horizontal scanning unit region is scanned (step S102). Assuming the horizontal scanning unit region 12a is number zero, the horizontal scanning unit region 12b is number one, the horizontal scanning unit region 12c is number two, . . . , and the horizontal scanning unit region 12d is number n. Currently, i=0, and thus the horizontal scanning unit region 12a is scanned.

The reception data during scanning of the horizontal scanning unit region 12a is then saved in a reception data table in the storage unit 18 (step S103).

FIG. 4 shows a configuration diagram of one example of a reception data table 19. In the figure, the reception data table 19 is configured by numerous records including an i field 19a, a distance field 19b, and a reception level field 19c. The first record is a reception data saving record of i=0 (i.e., horizontal scanning unit region 12a), the second record from the first is the reception data saving record of i=1 (i.e., horizontal scanning unit region 12b), the third record from the first is the reception data saving record of i=2 (i.e., horizontal scanning unit region 12c), . . . , and the last record is the reception data saving record of i=n (i.e., horizontal scanning unit region 12d). Here, n is a total number of horizontal scanning unit regions 12a to 12d (number of segmentations of the horizontal scanning angle $\Sigma\beta$).

The distance field 19b of each record is stored with the distance to the target detected from the reception data of the corresponding horizontal scanning unit region, and the reception level field 19c is stored with the intensity of the reception data (reception level: intensity of light received).

After saving of the reception data is completed, the variable i is counted up (step S104), and judgment is made whether or not the variable i is the same or greater than the number of segmentations n of the horizontal scanning angle $\Sigma\beta$ (step S105). If the judgment result is negative ("NO"), determination is made as still being in the middle of one horizontal scanning period, and step S102 and thereafter are again executed, whereas if the judgment result is positive ("YES"), determination is made that one horizontal scanning period is completed, and the process proceeds to step S1 of FIG. 2.

Figure 5:
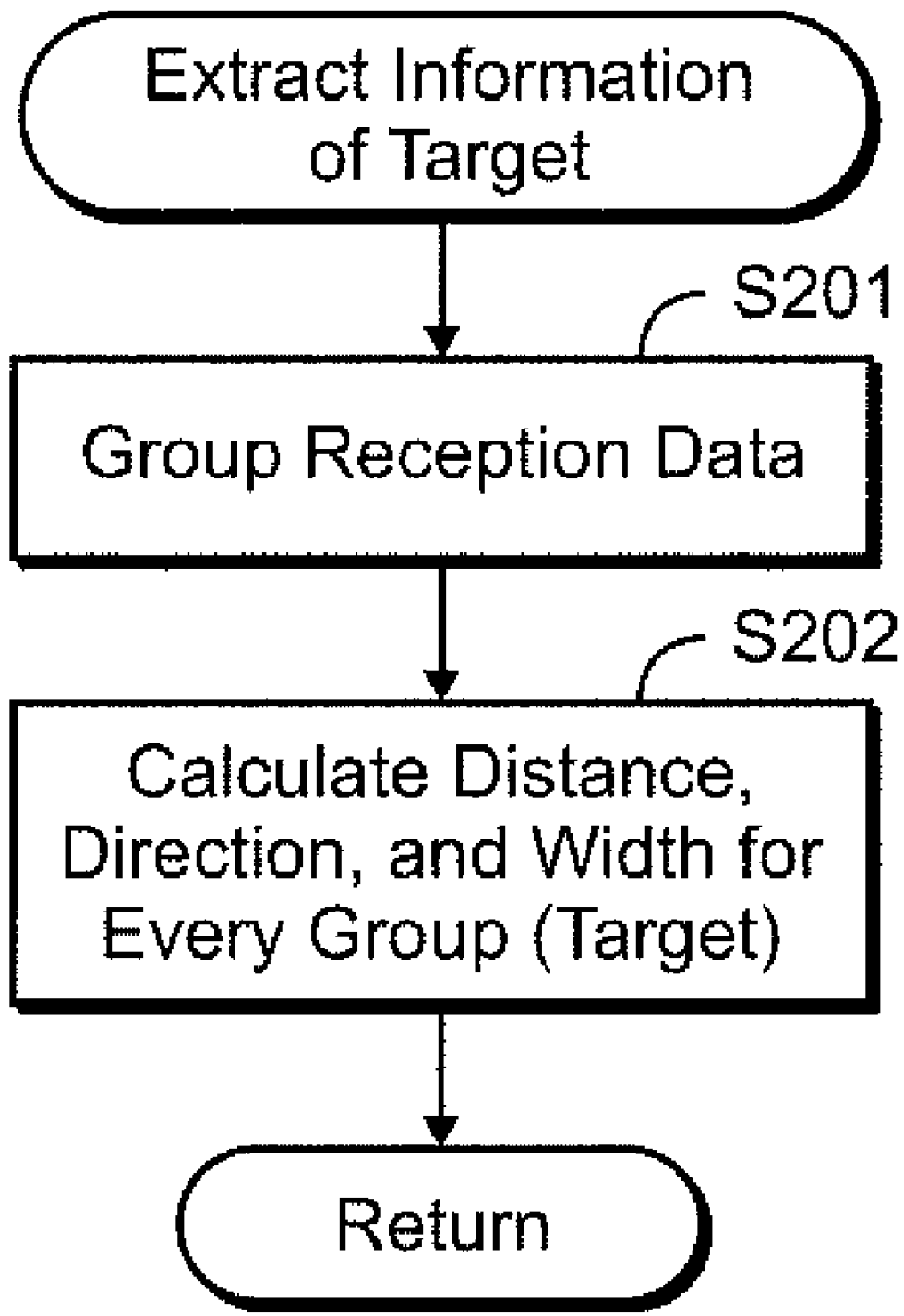
FIG. 5 shows a diagram showing a specific operation flow of a target information extracting process (step S200 of FIG. 2)

FIG. 5 shows a diagram showing a specific operation flow of the target information extracting process (step S200 of FIG. 2). In this flow, the reception data stored in the reception data table 19 is first grouped (step S201), the distance, the direction, and the width for every group are calculated (step S202), and then the process proceeds to step S300 of FIG. 2. The distance, the direction, and the width for every group are the distance of the target, the direction of the target, and the width of the target, respectively.

Figure 6A:
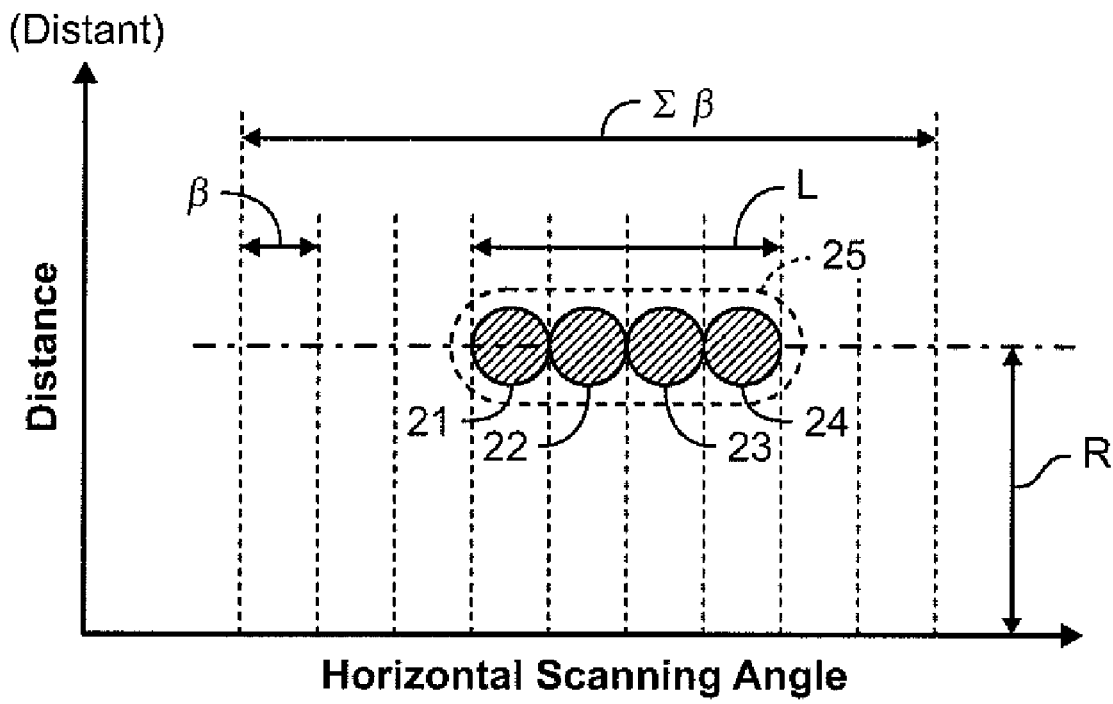
FIGS. 6A and 6B show conceptual diagrams of grouping of the reception data, and calculation of distance, direction, and width for every group.
Figure 6B:
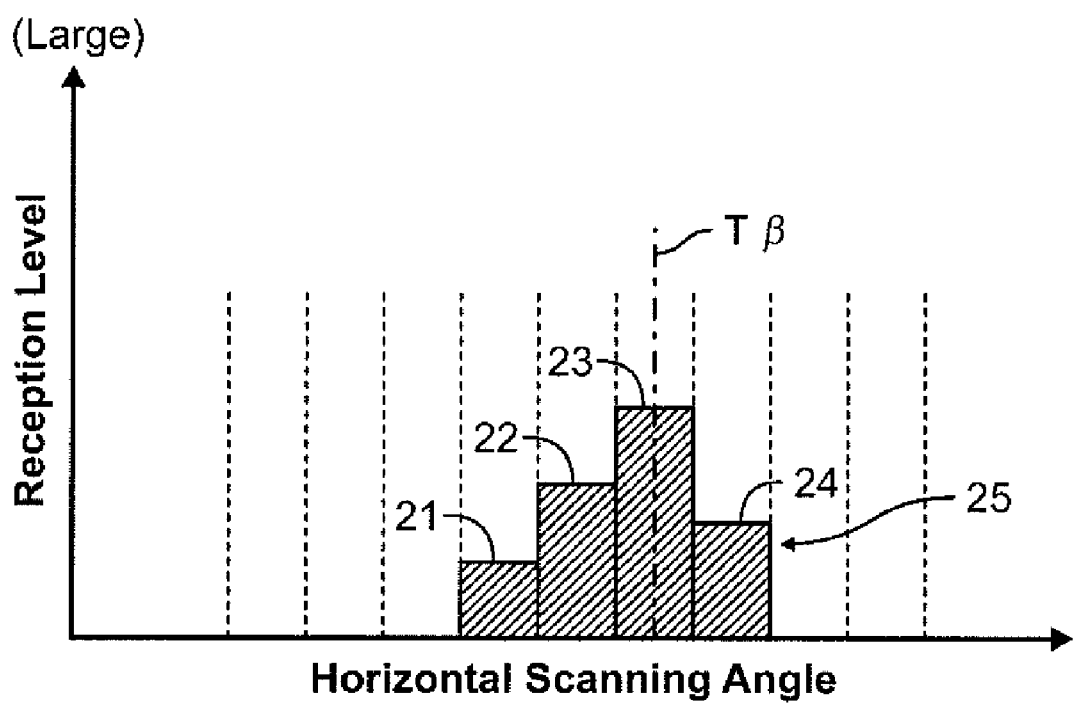

FIGS. 6A and 6B show conceptual diagrams of the grouping of the reception data, and the calculation of the distance, the direction, and the width for every group. In the figure, FIG. 6A has the distance on the vertical axis, and the horizontal scanning angle on the horizontal axis, and FIG. 6B has the reception level on the vertical axis and the horizontal scanning angle on the horizontal axis. The equally spaced broken lines on the horizontal axes of FIGS. 6A and 6B show the boundary of respective regions (horizontal scanning unit regions 12a to 12d) in which the horizontal scanning angle $\Sigma\beta$ is segmentalized into n parts.

Suppose the information of the reception data saved in the reception data table 19 of when one horizontal scanning is completed is as shown in FIG. 6A. That is, as one example, four reception data 21 to 24 are saved, the distance of the reception data 21 to 24 is substantially the same value (R), and the regions are densely-packed. In this case, the reception data 21 to 24 can be assumed as representing one target, and thus the four reception data are set as one group (i.e., target 25). The distance of the target 25 is specified as R and the width of the target 25 is specified as L, and furthermore, a center angle $T\beta$ of the region having the maximum reception level, for example, of the four reception data 21 to 24 configuring the target 25 is specified as the direction of the target 25, as shown in FIG. 6B.

Figure 7:
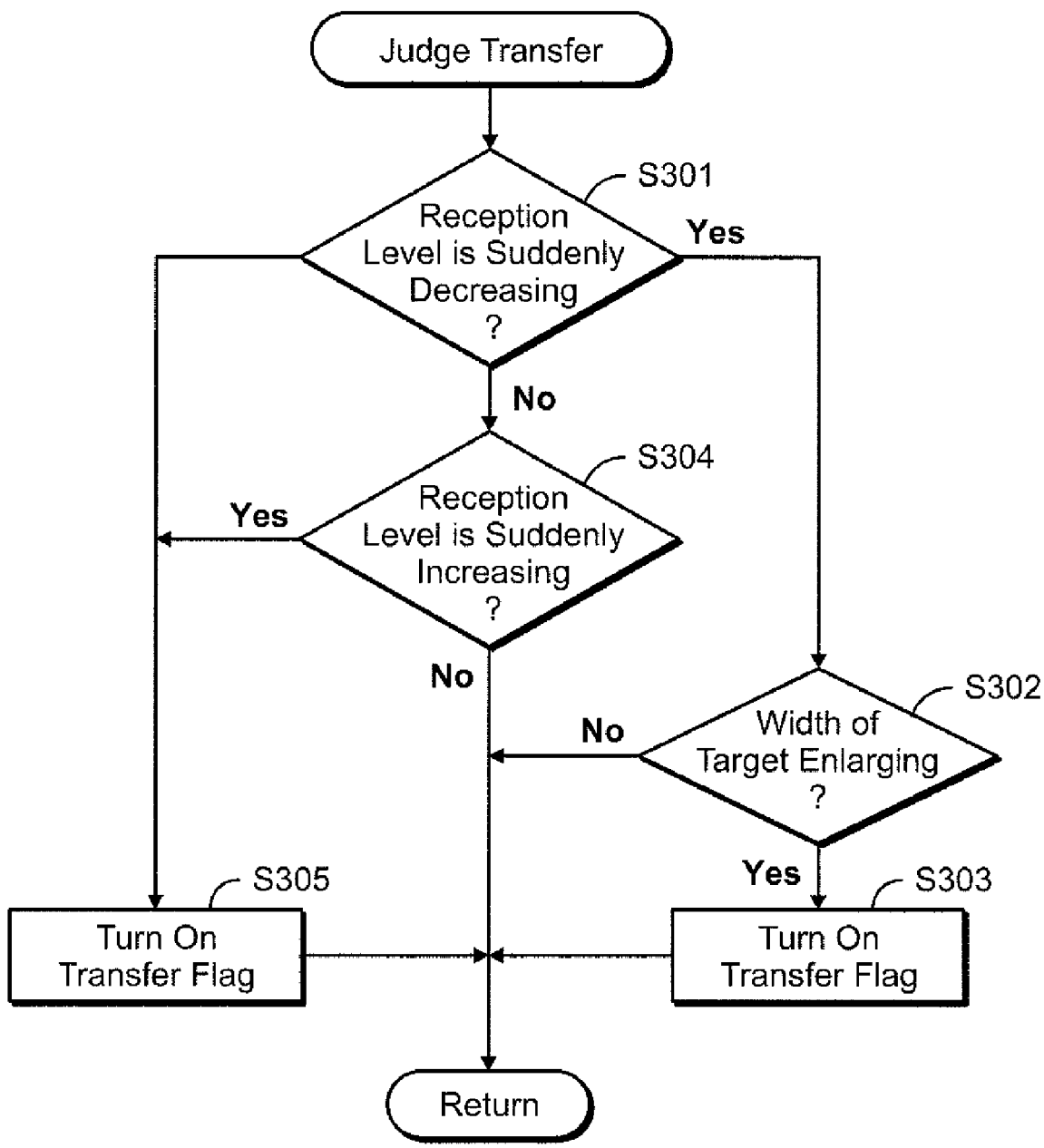
FIG. 7 shows a diagram showing a specific operation flow of a transfer judgment process (step S300 of FIG. 2)

FIG. 7 shows a diagram showing a specific operation flow of the transfer judgment process (step S300 of FIG. 2). In this flow, the intensity (reception level) of the reception data of the horizontal scanning period for this time and the intensity (reception level) of the reception data of the horizontal scanning period of the previous time or the few times before stored in the reception data table 19 of the storage unit 18 are compared to judge whether the reception level is in a suddenly decreasing tendency (step S301) or in a suddenly increasing tendency (step S304), and the process proceeds to step S3 of FIG. 2 if not suddenly decreasing nor suddenly increasing.

If in the suddenly decreasing tendency, the enlargement of the width of the target is judged (step S302), where the transfer flag is turned ON (step S303) and then the process proceeds to step S3 of FIG. 2 if enlarging. If the width of the target is not enlarging, the process proceeds to step S3 of FIG. 2. In the case of suddenly increasing tendency as well, the transfer flag is turned ON (step S305), and then the process proceeds to step S3 of FIG. 2.

Figure 8A:
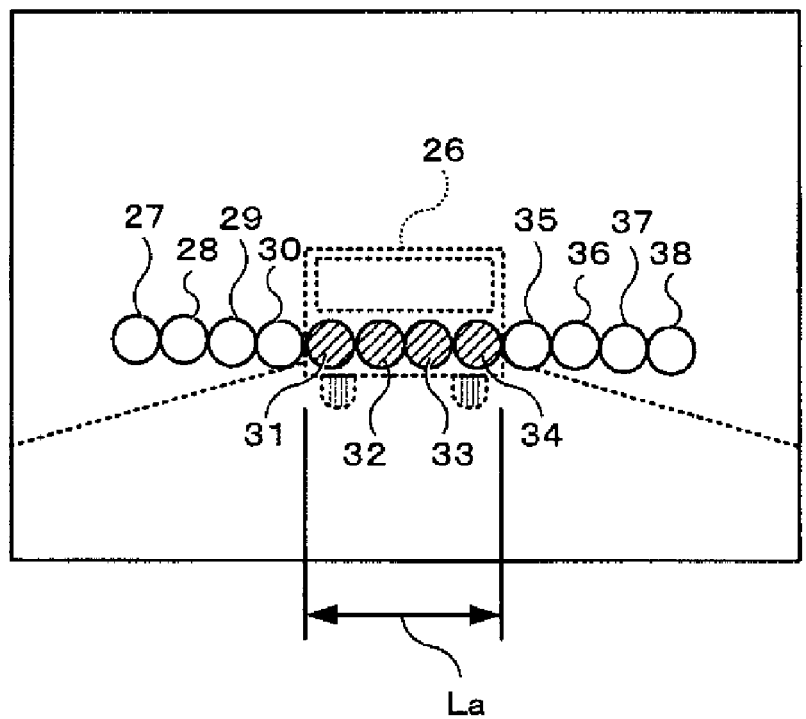
FIGS. 8A and 8B show explanatory diagrams of the judgment operation in the transfer judgment process.
Figure 8B:
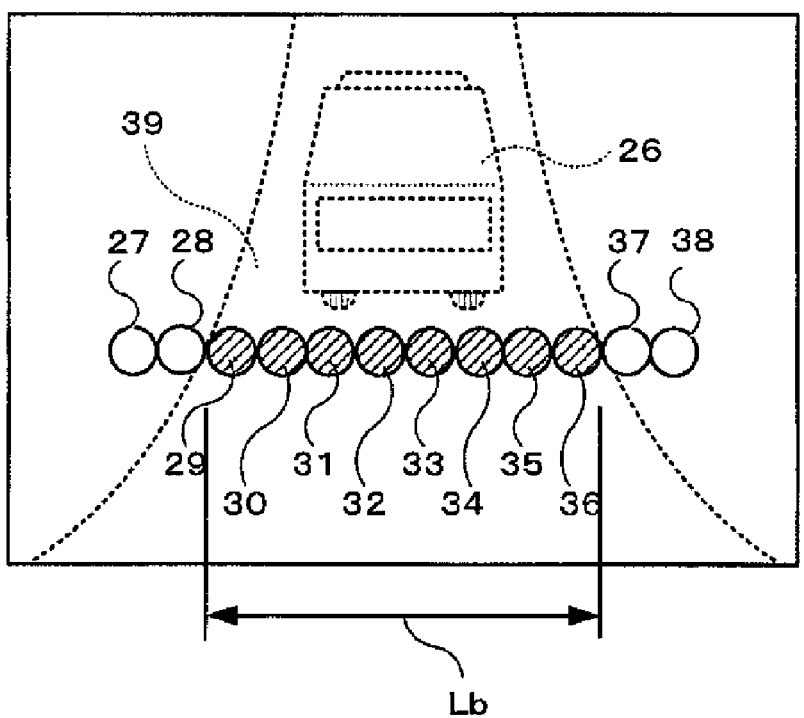

FIGS. 8A and 8B show explanatory diagrams of the judgment operation in the transfer judgment process. First, assume a case where a leading vehicle 26 is present in front of the own vehicle 10, as shown in FIG. 8A. Further, assume the leading vehicle 26 is irradiated with laser beams 27 to 38 of each horizontal scanning unit region from the in-vehicle radar device 11 of the own vehicle 10. In the illustrated example, four laser beams 31 to 34 with hatching hit the rear part of the leading vehicle 26, and thus the reflected lights of the four laser beams 31 to 34 are received by the in-vehicle radar device 11 as effective reception data in this case. With the laser beams 31 to 34 with hatching as the reception data below, the reception data 31 to 34 correspond to the four reception data 21 to 24 of FIG. 6. Therefore, the distance R to the leading vehicle 26 (correspond to target 25) is obtained from the reception data 31 to 34, and the width L of the leading vehicle 26 is obtained from the angle formed by the region from which the reception data 31 to 34 are obtained. Furthermore, the direction of the leading vehicle 26 is obtained from the position of the data having the maximum reception level of the reception data 31 to 34.

The transfer of when the leading vehicle 26 starts to go up a steep hill is shown in FIG. 8B. In this case, the road surface of an uphill 39 is irradiated with the majority of the laser beams 27 to 38 emitted from the in-vehicle radar device 11 of the own vehicle 10. In the illustrated example, the road surface of the uphill 39 is irradiated with eight laser beams 29 to 36 with hatching. Similar to the above, with the eight laser beams 29 to 36 as the reception data of the in-vehicle radar device 11, the intensity (reception level) of the reception data 29 to 36 is considerably weak compared to the reception data 31 to 34 of FIG. 8A in this case. This is because a portion that satisfactorily reflects light such as a number plate is arranged at the rear part of the leading vehicle 26, whereas such a portion does not exist on the road surface, and the light scatters by the microscopic bumps of the paved surface. The judgment condition (sudden decrease in reception level) of step S301 of FIG. 7 is the condition for distinguishing the difference between the rear part reflection of the leading vehicle 26 and the road surface reflection. According to the experiments of the inventors, the reflection intensity from the road surface was about 10% of the reflection intensity from the vehicle.

The difference between the rear part reflection of the leading vehicle 26 and the road surface reflection is not only the above condition (sudden decrease in reception level) but also appears in the width. In other words, a width La of the rear part reflection of the leading vehicle 26 is smaller than or equal to a maximum width 2.5 m of the vehicle defined in vehicle restriction law (see Law 3(1)(i)) excluding special vehicles, and a normal road surface width Lb is significantly larger than the vehicle maximum width (e.g., about 4 m or 5 m), and thus when the lining width (width Lb) of the reception data 29 to 36 significantly greater than 2.5 m is obtained (judged as "YES" in step S302 of FIG. 7) as shown in FIG. 8B, judgment is made that wrong target capturing (transfer) from the leading vehicle 26 to the uphill road surface apparently occurred with the above condition (sudden decrease in reception level).

Figure 11A:
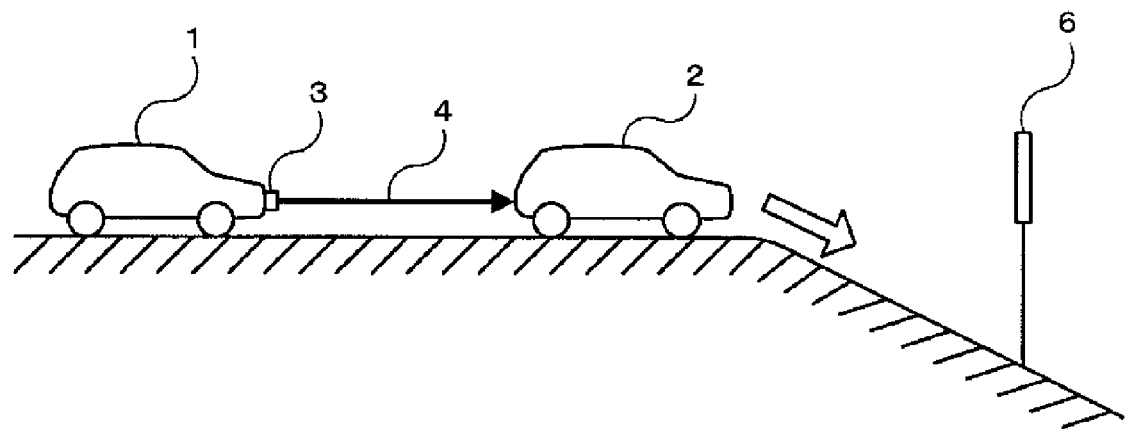
FIGS. 11A and 11B show explanatory views (case of a downhill) of the related art.
Figure 11B:
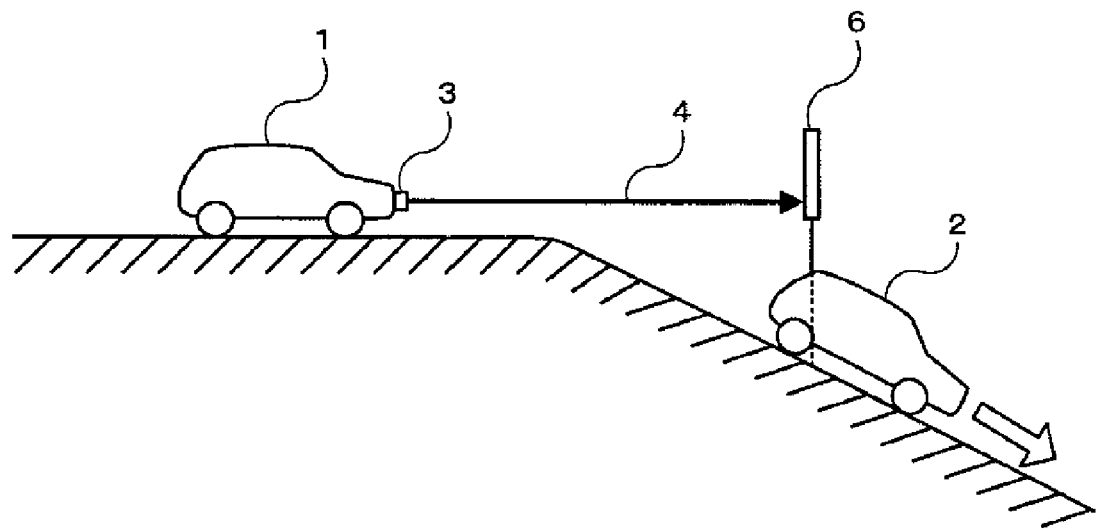

Even the transfer of when an obstacle (road sign board 6 of FIG. 11 etc.) that satisfactorily reflects light exists on a traffic lane in the middle of the downhill when the leading vehicle 26 starts to go down a steep downhill can also be judged, in principle, by the judgment condition (sudden increase in reception level) of step S304 of FIG. 7. This is because the road sign board 6 is drawn with characters and the like using paint mixed with glass powder, and thus the light is satisfactorily reflected by such glass powder (intensity of the reception data suddenly increases). According to the experiments of the inventors, the reflection intensity from the board was about twice the reflection intensity from the vehicle. Therefore, even in a case where the above condition (sudden increase in reception level) is satisfied, judgment is made that the wrong target capturing (transfer) from the leading vehicle 26 to the road sign board 6 apparently occurred.

As described above, according to the in-vehicle radar device 11 of the present embodiment, it is possible to reliably avoid the occurrence of wrong target recognition (transfer) that arises when the leading vehicle starts to go up a steep hill or when an obstacle (road sign board etc.) that satisfactorily reflects light is installed in the middle and the leading vehicle starts to go down a steep hill.

It should be recognized that the idea of the present invention is not limited to the above description, and various development examples and variants are encompassed within the scope of the idea, and the following may be adopted.

The irradiation angle in the vertical direction of the laser beam 12 is changed to slightly upward when the transfer of when the leading vehicle 26 starts to go up the steep hill is judged. The irradiation angle in the vertical direction of the laser beam 12 is changed to slightly downward when the transfer of when the leading vehicle 26 starts to go down the steep hill is judged. Either case is preferable as the leading vehicle 26 can be recaptured.

Figure 9:
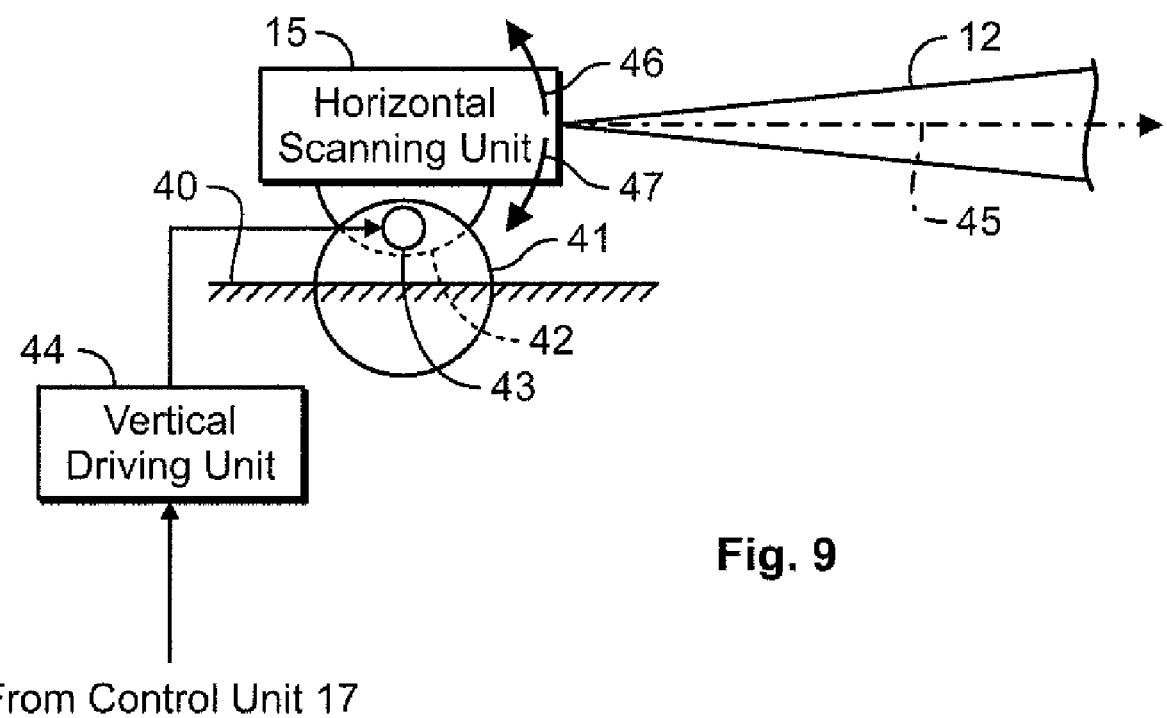
FIG. 9 shows a configuration diagram of one example of a vertical direction changing mechanism of a laser beam.
Figure 10A:
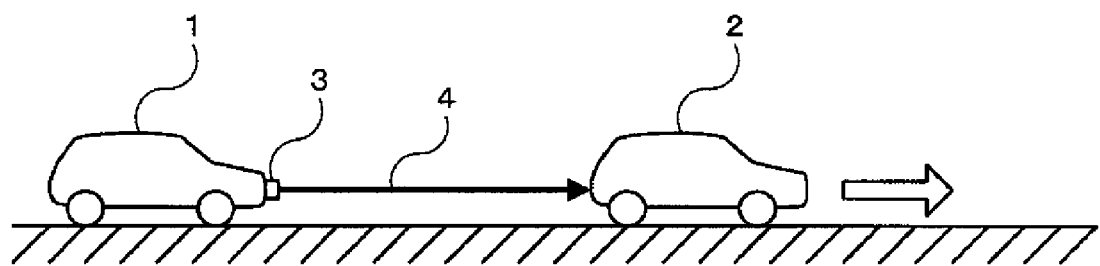
FIGS. 10A and 10B show explanatory views (case of an uphill) of the related art.
Figure 10B:
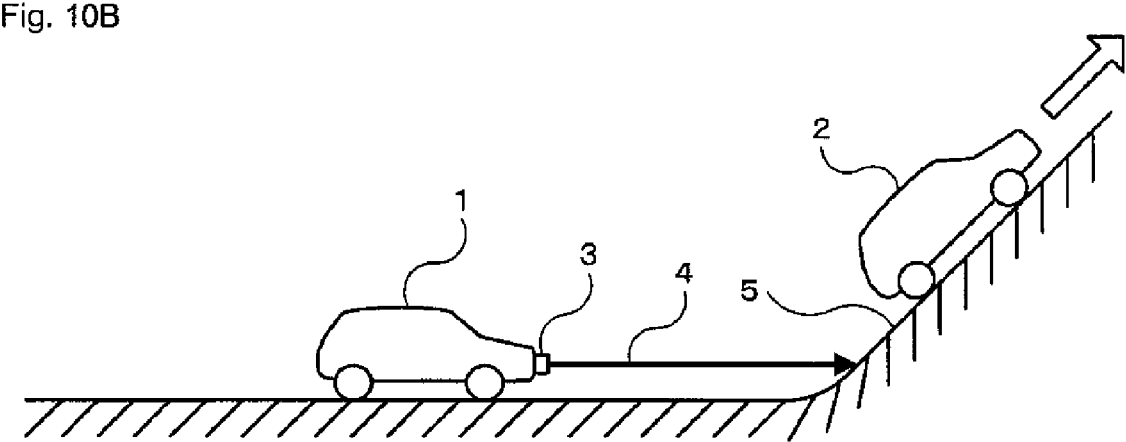

FIG. 9 shows a configuration diagram of one example of a vertical direction changing mechanism of the laser beam. In the figure, a base 41 is fixed to a horizontal site 40 of a vehicle body (of the own vehicle 10), and the horizontal scanning unit 15 having the emitting surface of the laser beam 12 facing the right is integrally attached on a seat 42 axially supported in a pivotal manner on the base 41. An actuator 43 such as a motor is attached to the base 41, which actuator 43 normal rotates or reverse rotates by a required amount according to the polarity and the magnitude of a drive current from a vertical driving unit 44, and the vertical driving unit 44 generates the drive current according to a control command from the control unit 17 (see FIG. 1). According to such a configuration, the horizontal scanning unit 15 integral with the seat 42 pivots by the normal rotation or the reverse rotation of the actuator 43, and thus an optical axis 45 of the laser beam 12 changes to upward in the vertical direction as shown by an arrow 46 or downward in the vertical direction as shown by an arrow 47 with such pivoting. It goes without saying that the vertical direction changing mechanism of the laser beam may be any other than the illustrated type. The point is merely to change the optical axis 45 of the laser beam 12 upward in the vertical direction as shown by the arrow 46 or downward in the vertical direction as shown by the arrow 47 according to the control command from the control unit 17.

The following may be used for the condition of judging the transfer when the leading vehicle starts to go up a steep hill.

Condition 1: Reception level for this time is decreased by a predetermined percentage in comparison with the reception level of the previous time or the few times before.

Condition 2: Reception data is the data of the target being captured.

Condition 3: Reception data is the data of the target in close range. The close range refers to a close distance of an extent the own vehicle may hit the target when the target suddenly stops.

Condition 4: Target is spread over the entire horizontal field (horizontal scanning range) of the in-vehicle radar device.

Condition 5: Width of the target corresponds to a general road surface width and such width is significantly larger than the width of a general vehicle.

Judgment is made that the transfer of when the leading vehicle starts to go up a steep hill occurred when the transfer judgment conditions: condition 1, condition 2, condition 3, and condition 4 are satisfied, or when condition 1, condition 2, condition 3, and condition 5 are satisfied. This is preferable in practical use.

The following may be used for the condition of judging the transfer when the obstacle (road sign board etc.) that satisfactorily reflects light is installed in the middle and the leading vehicle starts to go down a steep hill.

Condition 1: Reception level for this time is increased by a predetermined times in comparison with the reception level of the previous time or the few times before.

Condition 2: Reception data is the data of the target being captured.

Condition 3: Reception data is the data of the target in intermediate/long range. The intermediate/long range refers to a sufficient distance of an extent the laser beam emitted from the in-vehicle radar device reaches the obstacle (road sign board etc.) installed in the middle of the steep hill that satisfactorily reflects light.

Judgment is made that the transfer of when the leading vehicle starts to go down a steep hill occurred when the transfer judgment conditions: condition 1, condition 2, and condition 3 are satisfied. This is preferable in practical use.

The above description is for application to the in-vehicle radar device using laser beam, but is not limited thereto, and application may be made to an in-vehicle radar device using other electromagnetic wave medium such as an electric wave.

What is claimed is:

1. An in-vehicle radar device comprising:
   a transmission section for emitting an electromagnetic wave;
   a scanning section for horizontally scanning the electromagnetic wave emitted by the transmission section; and
   a reception section for receiving a reflected wave reflected by a target with respect to the electromagnetic wave emitted by the transmission section;
   wherein the in-vehicle radar device detects, based on an elapsed time from when the transmission section emitted the electromagnetic wave until the reception section receives the reflected wave and the scanning direction of the electromagnetic wave by the scanning section, at least a position and a horizontal width of the target reflecting the electromagnetic wave, and
   wherein the in-vehicle radar device further comprises:
      a storage section for storing intensity of a previous time or a few times before of the reflected wave received by the reception section;
      a comparing section for comparing the intensity of the reflected wave of the previous time or the few times before stored in the storage section and intensity for this time; and
      a first judgment section for judging that the target detected this time differs from a target continuously detected the from the previous time or the few times before when the intensity of the reflected wave for this time suddenly decreased compared to the intensity of the previous time or the few times before, and the horizontal width of the target becomes greater than a horizontal width of a general vehicle.

2. The in-vehicle radar device according to claim 1, further comprising a changing section for changing an irradiation angle in a vertical direction of the electromagnetic wave upward when a wrong target is judged in the first judgment section.

3. An in-vehicle radar device comprising:
   a transmission section for emitting an electromagnetic wave;
   a scanning section for horizontally scanning the electromagnetic wave emitted by the transmission section; and
   a reception section for receiving a reflected wave reflected by a target with respect to the electromagnetic wave emitted by the transmission section;
   wherein the in-vehicle radar device detects, based on an elapsed time from when the transmission section emitted the electromagnetic wave until the reception section receives the reflected wave and the scanning direction of the electromagnetic wave by the scanning section, at least a position and a horizontal width of the target reflecting the electromagnetic wave, and
   wherein the in-vehicle radar device further comprises:
      a storage section for storing intensity of a previous time or a few times before of the reflected wave received by the reception section;
      a comparing section for comparing the intensity of the reflected wave of the previous time or the few times before stored in the storage section and intensity for this time; and
      a second judgment section for judging that the target detected this time differs from a target continuously detected from the previous time or few times before when the intensity of the reflected wave for this time suddenly increased compared to the intensity of the previous time or the few times before.

4. The in-vehicle radar device according to claim 2, further comprising a changing section for changing an irradiation angle in a vertical direction of the electromagnetic wave downward when a wrong target is judged in the second judgment section.

* * * * *